United States Patent Office 3,296,095
Patented Jan. 3, 1967

3,296,095
METHOD FOR DETERMINING THE EXISTENCE OF EXTRATERRESTRIAL LIFE
Albin M. Nowitzky, Chatsworth, Calif., assignor to Universal Match Corporation, St. Louis, Mo.
No Drawing. Filed Apr. 6, 1964, Ser. No. 357,767
9 Claims. (Cl. 195—103.5)

It has been generally acknowledged by the scientific community that the search for extraterrestrial life and for the origin of life constitute the most important aims of space exploration. These aims also serve to justify the momentous expenditures of technical effort and financial resources which the space science programs require.

In support of the search for life on other planets, devices and techniques capable of detecting the existence and nature of viable material are under development. These devices are being considered for inclusion in the first interplanetary scientific payloads scheduled for entry into extraterrestrial atmospheres and contact with other planetary bodies. Accordingly, terrestrial sterilization of the affected payload is a decidedly outstanding design and operational requirement.

Various designs and models of devices have become known and demonstrated which are intended to land on foreign bodies, for instance, on the Lunar or the Martian surface, and subsequently to roll along, or walk across such a surface, to extract soil samples, to measure characteristics of the surface and of the surrounding atmosphere, and to communicate such information back to the earth. Moreover, vehicles of this type are equipped to carry various sophisticated intelligence gathering devices, such as a television camera or spectrometer, and to transmit to an orbiting satellite or directly to the earth all of the information gathered. The main purpose of this instrumentation, as stated heretofore, is the search for and determination of extraterrestrial life.

Current life detector designs, although ingenious, appear to have in common one exceptionally noteworthy disadvantage, that is, they are equipped to detect a type of life which is by definition terrestrial. As a result, the subsequent sample read-out could result in the "negative" reading, the accompanying confusion of results, and the disastrous probability of contamination followed by a future positive transmission.

One of the principal objects of this invention is to provide a method for determining the existence of extraterrestrial life, which method is free from terrestrial influences and experiences.

Another object of this invention is a method for determining the existence of extraterrestrial life by observing the existence of a metabolic reaction on the extraterrestrial body.

A further object of this invention is a method for setting up conditions conducive to a metabolic reaction and for determining the development and existence of such metabolic reaction.

A still further object of this invention is a method for determining life an an extraterrestrial body using an in situ generated nutrient and an atmosphere prevailing on such a body for determining the presence or absence of a metabolic reaction within this mixture.

Other and still further objects of this invention will become more clearly apparent from the following description.

The method described hereafter is based on the premises that metabolic gas production is common to all life, that such gas production is accompanied by a detectable energy development, and that the nutrient for metabolic reaction of an exobiologic sample must be generated in situ in order to yield a reliable, credible result.

The various mechanisms for effecting the several steps described hereafter are common mechanical arrangements and are generally of the type presently designed or demonstrated on models intended for landing on extraterrestrial bodies. The timing of the steps may either be preprogrammed or may be instituted by command signals from the earth or from an orbiting auxiliary vehicle.

*Step 1.*—The basic step, of course, comprises the landing of a suitable space vehicle on the extraterrestrial body. The vehicle is provided among other things with servo mechanisms, a supply of distilled water, sample feeding means, heating means, test chambers, power means, instrumentation, and control means to activate and regulate the various instrumentalities. Upon landing, the vehicle is brought to an appropriate sampling location which is selected as a function of surface penetrability. This locating can be a self-determining action by mechanisms provided in the vehicle or by remote control devices. The location must be of such a character that the surface can be penetrated in order to extract a sample of extraterrestrial soil.

*Step 2.*—This step comprises the actual extraction of an extraterrestrial soil sample by the mechanism supplied in the landed vehicle. The mechanism for this step can be a drilling or a surface scraping instrumentality. The soil sample is then inserted into a nutrient generator chamber provided by the vehicle.

*Step 3.*—A predetermined amount of distilled water, carried by the landed vehicle, is mixed with the sample of extraterrestrial soil to generate an in situ nutrient. If desired, mixing means within the chamber cause a homogeneous nutrient mixture.

*Step 4.*—The mixture of extraterrestrial soil and water is exposed to terrestrial sterilization, for instance, heat sterilization at 550° F. for 30 minutes. This sterilization establishes a basic uncontaminated nutrient. It shall be understood, however, that other sterilization processes may be carried out by suitable means provided in the landed vehicle.

*Step 5.*—Following terrestrial sterilization, the nutrient is transferred to a test chamber and exposed for a limited period of time to the prevailing extraterrestrial atmosphere, the atmosphere being substantially that at which the soil was extracted. In order to achieve proper exposure, mechanical activating means or aerating techniques can be used. Subsequently to this exposure, the nutrient is sealed in the test chamber.

*Step 6.*—A sensor means provided in the test chamber registers the occurrence of a metabolic reaction, for instance, metabolic temperature rise, or gas generation, and this sensor means, in turn, modulates a suitable telemetering circuit to transmit such information to an orbiting satellite vehicle or directly to the earth.

It will be seen that this method has as its main object the determination of the existence of a metabolic reaction by using extraterrestrial soil and the exposure of this soil to the extraterrestrial atmosphere. Of particular importance in this connection is the generation of basic uncontaminated nutrient which subsequently serves as the test sample. Quite obviously, the sterilization must be of such a character as to assure zero terrestrial contamination.

For determining the occurrence of a metabolic reaction it will be advantageous to prepare two samples, that is, a first sample as described heretofore which may become active and a second sample prepared likewise from the sterilized nutrient mixture. This second sample after sterilization is maintained sealed off from the atmosphere and, hence, will serve as a control. Both samples can readily be arranged in a comparison or difference circuit for obtaining a comparison between the activated sample (first sample) and the steady state sample (second sample). Metabolic reaction may be sensed, for instance, by measuring the temperature rise, gas evolution or other factors commonly associated with a metabolic reaction. The transmittal of the sensed data by the use of telemetering circuits is well known and understood by those skill in the art and need not be described.

It will be apparent that the method described heretofore is an arrangement for determining the possibility and existence of extraterrestrial life based on materials and conditions prevailing on the extraterrestrial body. This method, therefore, is an in situ determination as contrasted with observations and deductions made from the earth or from an observation post in space.

While there has been described a preferred embodiment of the method for determining the existence of extraterrestrial life, it will be apparent to those skilled in the art that various changes and modifications may be made without deviating from the intent and spirit of the present invention which should be limited only by the scope of the appended claims.

What is claimed is:

1. A method for determining the existence of extraterrestrial life comprising the steps of:
    extracting a sample of soil from an extraterrestrial body;
    generating an in situ nutrient by mixing said sample with water;
    subjecting said nutrient to sterilization;
    exposing said sterilized nutrient to extraterrestrial atmosphere;
    and sensing the occurrence of a metabolic reaction in said exposed nutrient.

2. A method for determining the existence of extraterrestrial life comprising the steps of:
    landing a vehicle on an extraterrestrial body;
    extracting a sample of soil from said body;
    generating an in situ nutrient by mixing said sample with terrestrial water carried by said vehicle;
    subjecting said nutrient to sterilization;
    exposing said sterilized nutrient to extraterrestrial atmosphere;
    sensing the occurrence of a metabolic reaction in said nutrient and providing a signal responsive to such occurrence.

3. A method for determining the existence of extraterrestrial life comprising the steps of:
    landing a vehicle on an extraterrestrial body;
    extracting a sample of soil from said body;
    generating an in situ nutrient by mixing said sample with distilled terrestrial water carried by said vehicle;
    subjecting said nutrient to terrestrial sterilization;
    exposing said sterilized nutrient to the extraterrestrial atmosphere which surrounds the location at which said sample was extracted;
    sensing the occurrence of a metabolic reaction in said nutrient and providing a signal responsive to such occurrence.

4. A method for determining the existence of extraterrestrial life comprising the steps of:
    landing a vehicle on an extraterrestrial body;
    extracting a sample of soil from said body;
    generating an in situ nutrient by mixing said sample with water;
    subjecting said nutrient to terrestrial sterilization;
    exposing said sterilized nutrient for a limited period of time to the extraterrestrial atmosphere which surrounds the location at which said sample was extracted;
    sensing the occurrence of a metabolic reaction in said nutrient and providing a signal responsive to such occurrence.

5. A method for determining the existence of extraterrestrial life comprising the steps of:
    landing a vehicle on an extraterrestrial body;
    extracting a sample of soil from said body;
    generating an in situ nutrient by mixing said sample with distilled terrestrial water carried by said vehicle;
    subjecting said nutrient to terrestrial sterilization;
    exposing said sterilized nutrient to the extraterrestrial atmosphere which surrounds the location at which said sample was extracted;
    sealing off said nutrient with an amount of said atmosphere;
    sensing the occurrence of a metabolic reaction in said nutrient and providing a signal responsive to such occurrence.

6. A method as described in claim 5 wherein said sterilization comprises heating of said nutrient.

7. A method as described in claim 5 wherein said sensing comprises a monitoring of temperature.

8. A method as described in claim 5 wherein said sensing of a metabolic reaction comprises monitoring of gas generation in said nutrient.

9. A method for determining the existence of extraterrestrial life comprising the steps of:
    landing a vehicle on an extraterrestrial body;
    extracting soil from said body to provide a first and a second sample;
    generating an in situ nutrient by mixing said samples with distilled terrestrial water carried by said vehicle;
    subjecting said samples to terrestrial sterilization;
    exposing said first sample for a limited period of time to the extraterrestrial atmosphere which surrounds the location at which said sample was extracted while maintaining said second sample sealed off from said atmosphere;
    sensing the occurrence of a metabolic reaction in said first sample by sensing the occurrence of a metabolic reaction in both samples and developing a signal responsive to the difference between said samples;
    and providing a signal responsive to such difference.

References Cited by the Examiner

The California Institute of Technology Quarterly, vol. 2, No. 3, Summer 1961, pages 12–17.

Science, vol. 138, pages 114–121, October 1962.

A. LOUIS MONACELL, *Primary Examiner.*

A. E. TANENHOLTZ, *Assistant Examiner.*